Figure 1:
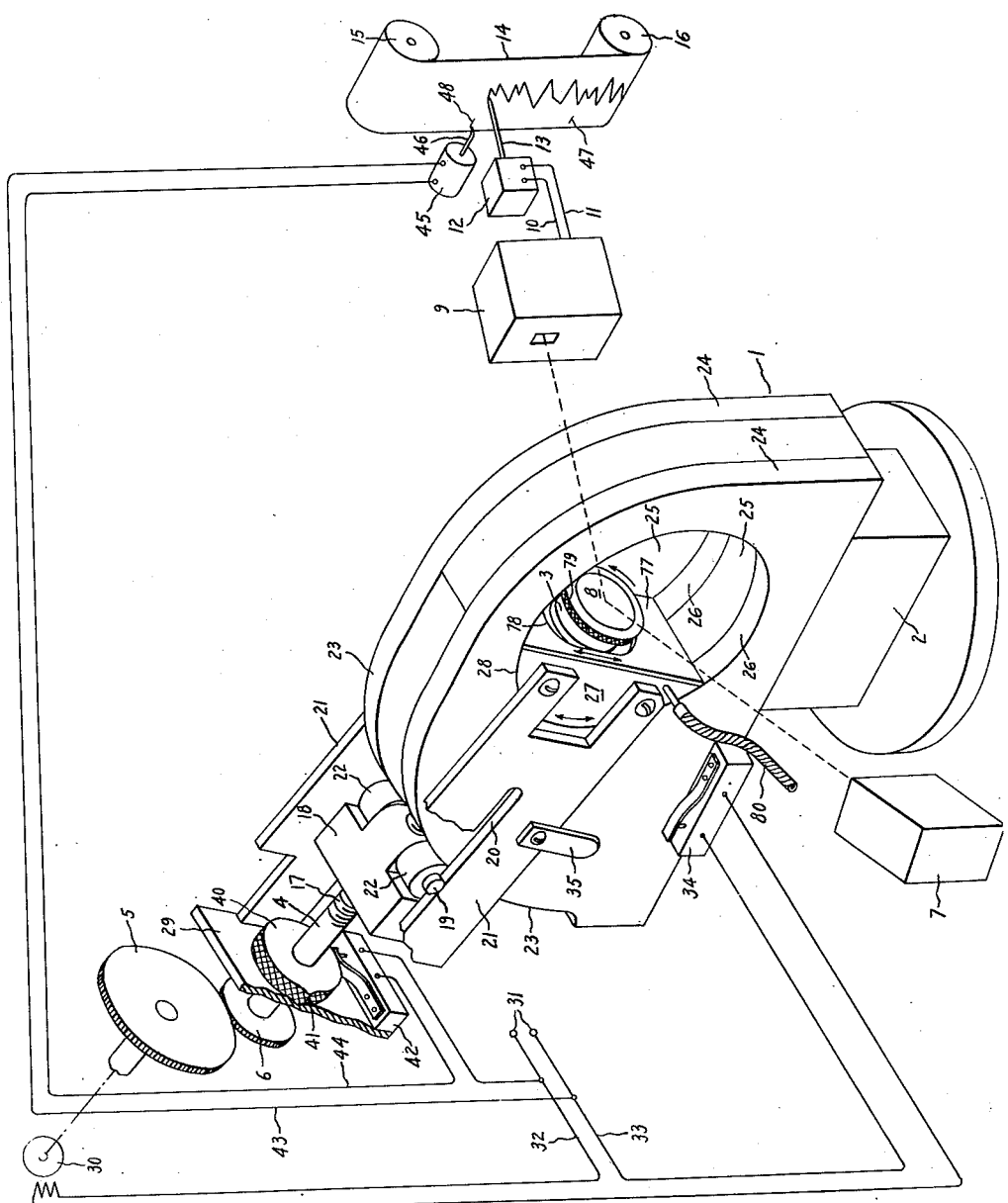

July 9, 1957  A. N. HOLDEN ET AL  2,798,957
REFLECTION X-RAY DIFFRACTION APPARATUS AND METHOD
Filed Sept. 8, 1953  2 Sheets-Sheet 1

Inventors:
Abe N. Holden,
Joseph E. Burke,
Myron B. Reynolds,
Joseph S. Lukesh,
by *Darrell L. Mack*
Their Attorney July 9, 1957  A. N. HOLDEN ET AL  2,798,957
REFLECTION X-RAY DIFFRACTION APPARATUS AND METHOD
Filed Sept. 8, 1953  2 Sheets-Sheet 2

Inventors:
Abe N. Holden,
Joseph E. Burke,
Myron B. Reynolds,
Joseph S. Lukesh,
by *Crowell S. Mack*
Their Attorney.

United States Patent Office 2,798,957
Patented July 9, 1957

2,798,957

REFLECTION X-RAY DIFFRACTION APPARATUS AND METHOD

Abe N. Holden, Schenectady, Joseph E. Burke, Ballston, Myron B. Reynolds, Glenville, and Joseph S. Lukesh, Scotia, N. Y., assignors to General Electric Company, a corporation of New York Application September 8, 1953, Serial No. 378,794

7 Claims. (Cl. 250—53)

The present invention comprises an improved recording X-ray diffraction apparatus of the reflection type and a method of continuously examining metallic specimens. It is the object of our invention to provide for the rapid determination of the crystal orientation or texture of various crystalline aggregates by a process and in an apparatus utilizing reflection of X-rays from the surface of a crystalline material, which is of particular value in the investigation of materials opaque to X-rays.

Heretofore the plotting of the so-called pole figure graphs of X-ray diffraction from crystalline specimens has involved many laborious separate determinations made by an operator who took observations in a step-by-step manner. It is the object of our invention to provide a method and apparatus for subjecting a specimen to scanning with X-rays over a continuous track and by coincidental operation of recording apparatus producing a timed record which is so indexed with reference to the scanning operation that a linear graph is produced from which crystallographic structure may be interpreted directly or, if desired, diffraction pole figures may be plotted.

In the practice of our invention, a specimen to be examined is scanned by a beam of X-rays which is reflected from the surface of the specimen, the X-rays being diffracted by the crystallites appearing at the reflecting surface. The variations in intensity of the reflected X-ray beam are translated into electrical variations which in turn operate recording mechanism for plotting a graph on a chart.

In accordance with one of the features of novelty of our invention, the specimen is scanned by a beam of X-rays while rotative displacement occurs between such specimen and the beam of X-rays. During the rotative movement, the specimen is tilted continuously so as to cause the scanning X-ray beam to be reflected sequentially from all the planes in the specimen whose normals would lie in a spiral path on a stereographic projection. The specimen is rotated during the scanning process through one or more complete 360° revolutions about an axis contained in a plane normal to the plane containing the incident and reflected parts of the X-ray beam and during such rotations the axis of rotation is tilted continuously a small number of degrees, for example, ten degrees, from its starting position while still remaining in aforesaid plane. A spiral scanning path has an advantage over any path involving rotations at discrete angles of tilt when the pole figure which is obtainable has a two-fold or four-fold symmetry, the sensitivity of the device being multiplied by the symmetry factor. Should an X-ray reflection spot be missed at a 0° rotation position in a four-fold symmetry pole figure the spot may reflect also at 90°, 180°, 270° or 360°, at which positions the tilt of the specimen will have increased progressively from 2½° to 5° to 7½° and 10° for a spiral path of 10° tilt per revolution. Thus a 10° tilt per revolution of spiral track will collect in four-fold symmetry the same information that could only be collected by four complete revolutions, each at an increasing discrete 2½° tilt.

Figure 2:
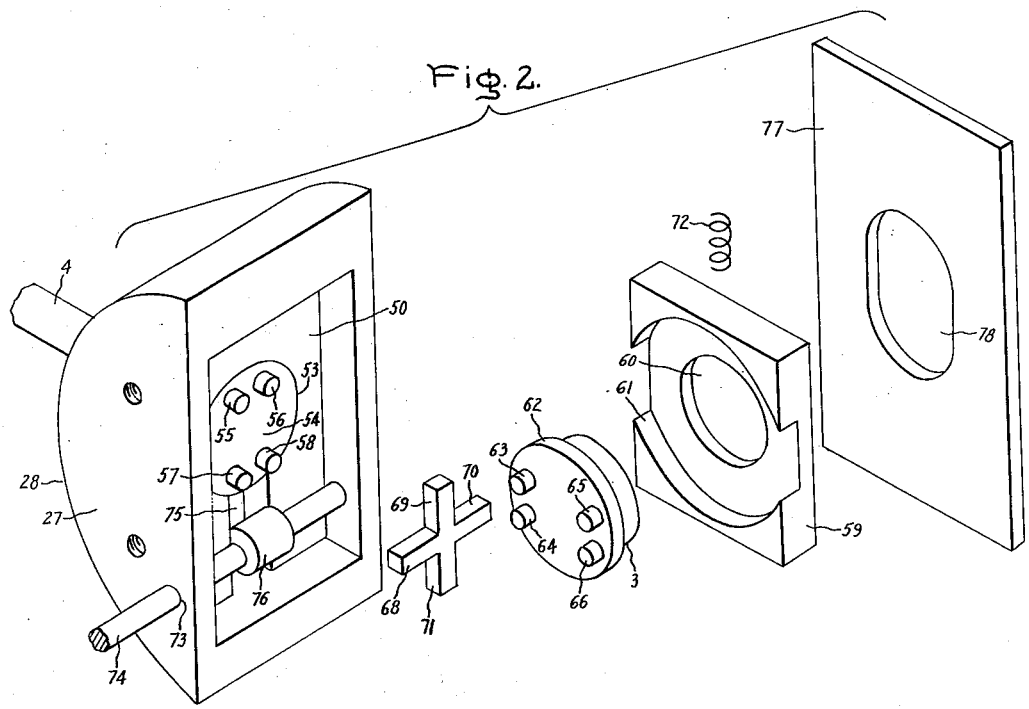
Figure 3:
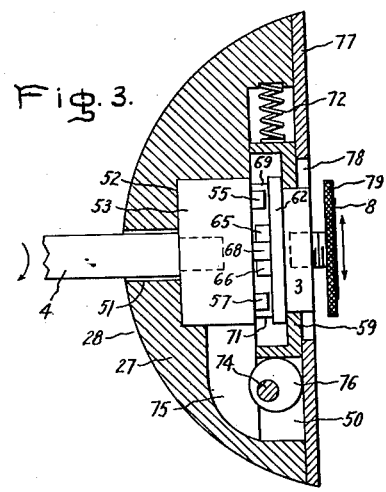

A device for carrying out our invention is shown in the accompanying drawing in which Fig. 1 is a perspective view in side elevation of an apparatus for carrying out our invention, some of the features being indicated in conventionalized form; Fig. 2 is an exploded view of a secondary scanning mechanism operating to oscillate the specimen under the X-ray beam parallel to its surface in order to integrate results over a wider area of the specimen than afforded by the spiral tracking path. Fig. 3 is a vertical section of the assembled apparatus shown in Fig. 2.

The apparatus shown in Fig. 1 provides a supporting frame 1 which is supported on a base 2. A specimen holder 3 is supported at the lower end of a rotatable shaft 4 which is rotatably driven by the gears 5, 6. The holder 3 is exposed in an opening of the frame 1, as is evident from the drawing, in a position to receive a collimated beam of X-rays from a source 7 and rotates with shaft 4. The beam is reflected from the surface of a specimen 8 supported on the holder 3 and is received by a Geiger counter 9. As indicated in Fig. 1 the collimated beam of X-rays from source 7 impinges upon the surface of specimen 8 at an acute angle of incidence, i. e., between 0° and 90° with respect to said surface and the axis of rotation of shaft 17.

The variable output electric current from the Geiger counter, corresponding to variations in intensity of the diffracted X-rays, is transmitted by the conductors 10, 11 to an electric recording apparatus 12 whereby a stylus 13 is operated to record a graph on a chart 14. The chart is supplied from a roll 15 and collected by roll 16 (by apparatus not shown), the speed of the chart being so timed with the speed of the X-ray scanning mechanism that the crystal diffraction results may be interpreted from the graph on the chart.

During the rotation of the shaft 4, a lead screw 17 formed on the shaft 4 engages and drives a cam nut 18 along shaft 4. Cam nut 18 is prevented from rotating with the shaft 4 by the engagement of pins 19 with slots 20 formed in duplicate support elements 21, the details of only one of which is shown. Cam nut 18 carries rollers 22 which are free to rotate on pins 19 and engage duplicate cam surfaces 23 formed on frame 1. Frame 1 comprises a pair of spaced duplicate plate elements 24, each provided with a circular opening 25 of equal size and in registry with each other. The inner surfaces 26 of these openings constitute bearing surfaces for the support 27 for the specimen holder 3, which support has a semi-cylindrical outer bearing surface 28 having a radius substantially equal to the radius of openings 25. Support elements 24 are each secured at their corresponding ends by suitable means to each end surface of the support 27 and extend in parallel relationship to a bridge member 29 which interconnects their opposite ends and serves as a support and bearing for shaft 4, as shown.

From the foregoing, it will be apparent that if shaft 4 is rotated in the appropriate direction to move cam nut 18 away from specimen holder support 27, elements 21, 27 and 29 will rotate or tilt as a unit about the center of openings 25, progressing from the inclined position shown in Fig. 1 toward a horizontal position. The rate of angular deflection of these elements is determined by the pitch and rate of rotation of lead screw 17 and the contour of cam surfaces 23. As illustrated in Fig. 1, it will therefore be understood that the described apparatus will rotate a specimen under examination in full, successive 360° revolutions about an axis maintained in a plane normal to the plane containing the incident and reflected X-ray beams and during each increment of rotation the axis of rotation and the specimen is continuously tilted a small number of degrees from the starting position. Furthermore, the original focus point of the X-ray beam is maintained on the axis of rotation at the center about which the specimen is tilted throughout the examination. By such a movement, the planes within the specimen are brought into reflecting position in a continuously changing manner which may be tracked or plotted on a stereographic net as a continuous spiral. Since such plotting techniques are well known in the art, no further discussion of them is deemed necessary. Such a spiral might comprise, for example, 10° of specimen tilt for each 360° of revolution. However, it is obvious that by changing the cam contour or the pitch of the lead screw, or both the ratio of degree of tilt to degree of rotation may be varied as desired. It has been determined that the degree of tilt of the specimen is desirably restricted to a range of 60° to 0°. Starting inclinations of greater than 60° have been found unsatisfactory because of the introduction of errors of intensity of considerable magnitude. This limitation is of no practical importance. If information for a tilt of greater than 60° is desired, a second specimen mounted with a reflecting surface cut at 90° to the reflecting surface of the first specimen is investigated. It is obvious from the foregoing that many ingenious methods of specimen preparation would occur to a person skilled in the art.

The apparatus is driven and automatically shut off by an electric motor 30 which actuates the lead screw 4 and associated elements through the gear train 5, 6. The motor is energized from source 31 through leads 32, 33. Lead 33 contains a limit switch 34 which is normally closed during operation of the device, and is arranged to be opened by bumper 35 when the specimen holder tilt becomes 0°, thereby shutting off the power to the motor.

As a further aid in the subsequent plotting of the data recorded on chart 14, an automatic indexing stylus is incorporated. Secured to shaft 4 for rotation therewith is cam 40 having at least one lobe 41. Upon rotation of the cam 40, lobe 41 strikes and momentarily closes switch 42, which is biased in the open position. This completes a circuit through leads 43, 44 to a solenoid or other similar motor 45 which actuates a stylus or pen 46 to draw or otherwise mark chart 14 as at 47 and 48. These marks, in the case of a cam 40 with a single lobe, serve to indicate the beginning and end of each 360° revolution of the specimen. It is obvious that intermediate index marks could be made at, for example, 90°, 180° and 270° by the addition of an appropriate number of properly spaced lobes.

An important factor in texture studies with any goniometer is the grain size of the specimen to be examined. As the grain size increases and therefore the total number of grains in the specimen decreases, scattering of the reflected rays becomes excessive. For this reason, it is desirable when investigating specimens having a large grain size to move the specimen in its own plane in order to integrate over a greater number of grains. In order to accomplish this, the integrating specimen mount, illustrated in detail in Figs. 2 and 3, is provided.

The semi-cylindrical specimen holder support 27 is provided with a rectangular recess 50, a radial bore 51, and a counter-bore 52. A cylindrical connector 53 is secured to the end of shaft 4 for rotation therewith and is fitted in the counter-bore 52 with its face 54 flush with the bottom of recess 50. Extending from face 54 are four studs 55, 56, 57 and 58. A rectangular carrier plate 59 slides vertically within recess 50 and is centrally apertured at 60. The face of plate 59 adjacent connector 53 is circularly recessed as at 61, said recess being concentric with aperture 60. Specimen holder 3 is cylindrical and closely fits and extends through aperture 60. It is held in position with respect to plate 59 by an integral collar 62 which engages the bottom of recess 61. Extending from the end surface of holder 3 which is adjacent connector 53 are four studs 63, 64, 65 and 66. Separating the adjacent surfaces and studs of connector 53 and holder 3 is a cruciform transmission element 67 having four arms 68, 69, 70 and 71. Arms 69 and 71 are slidably confined between studs 55, 56 and 57, 58, respectively. Arms 68 and 70 are slidably confined between studs 65, 66 and 63, 64, respectively. A spring 72 is interposed between the upper edge of plate 59 and the corresponding side of recess 50 and biases the plate downwardly. A transverse bore 73 through the lower portion of recess 50 provides a bearing for a shaft 74. A centrally located vertically extending recess 75 is provided in the bottom of recess 50, and extends vertically to the counter-bore 52. Shaft 74 is provided with a cylindrical cam 76 which is eccentric with respect to the shaft and is accommodated by the recess 75 so that it may rotate with the shaft. Spring 72 continuously biases plate 59 against the cam 76. A cover plate 77 is secured to the recessed face of support 27 and serves to retain in place the movable elements contained therein. Plate 77 is provided with a centrally located elongated aperture 78 through which access may be had to the cylindrical specimen holder 3. A specimen stage 79 is removably secured by any suitable means to holder 3. Upon inspection of Fig. 3, it will be apparent that upon rotation of shaft 74 in either direction, the specimen holder 3 and stage 79 will oscillate in the direction indicated by the double-pointed arrow at a speed determined by the rate of rotation of shaft 74. As indicated in Fig. 1, shaft 74 may be driven by any suitable means, for example, by a motor-driven flexible shaft 80. Shaft 80 may be driven by its own motor (not shown), or by motor 30 through any suitable power take-off (also not shown). From the foregoing, it is apparent that the oscillatory specimen mount provides an independent specimen motion during the investigation and is ancillary to the rotation and inclination of the specimen. Inasmuch as the grain size of a specimen to be examined may be so small that the additional integration provided by the oscillatory mounting may be unnecessary, the drive to shaft 70 may be disconnected and the specimen merely rotated and tilted simultaneously.

The described apparatus greatly reduces the time required to examine a specimen by X-ray spectrometry, and further has the added advantage of making the examination and recording the results of such examination without the continuous supervision by a skilled technician or scientist. Once the examination is started, it will continue until completion by itself and at completion automatically shut off. It is obvious that additional limit switches may be incorporated to shut off the source of X-rays, the chart drive and perhaps actuate a signal means to call attention to the completion of the examination. Since such additional ancillary control means could readily be incorporated in the apparatus by any mechanic, no attempt is made either to illustrate or further describe any specific system.

While the present invention has been described by reference to a particular embodiment thereof, it will be understood that numerous modifications may be made by those skilled in the art without actually departing from the invention. We, therefore, aim in the appended claims to cover all equivalent variations as come within the true spirit and scope of the foregoing disclosure.

What we claim as new and desire to secure by Letters Patent of the United States is:

1. A method of continuously scanning an X-ray diffraction specimen comprising the steps of rotating a specimen about one axis, simultaneously rotating said specimen about a second axis intersecting said first axis at an angle of about 90°, projecting a continuous collimated beam of X-rays so that it impinges the surface of the specimen at an angle of incidence less than 90° and is reflected therefrom, the point of impingement and the point of intersection of said axes of rotation being substantially coincident, maintaining one of said axes of rotation in a plane normal to the plane containing the impinging and reflected X-ray beams and measuring the intensity of the reflected X-ray beams.

2. A method of continuously scanning an X-ray diffraction specimen comprising the steps of rotating a specimen having at least one substantially planar surface about a first axis which is normal to and passes through said planar surface, simultaneously rotating said specimen about a second axis intersecting said first axis at 90°, projecting a collimated beam of X-rays so that it impinges said planar surface at an angle of incidence less than 90° and is reflected therefrom, the point of impingement and the point of intersection of said axes of rotation coinciding substantially on said planar surface, maintaining said first axis of rotation in a plane normal to the plane determined by the impinging and reflected X-ray beams and measuring and recording the intensity of the reflected X-ray beam.

3. A method of continuously scanning an X-ray diffraction specimen comprising the steps of rotating a specimen having at least one substantially planar surface about a first axis which is normal to and passes through said planar surface, simultaneously rotating said specimen about a second axis intersecting said first axis at 90°, simultaneously rectilinearly oscillating said specimen in the plane of its planar surface, projecting a collimated beam of X-rays so that it impinges said planar surface at an angle of incidence less than 90° and is reflected therefrom, the point of impingement and the point of intersection of said axes coinciding substantially on said planar surface, maintaining said first axis in a plane normal to the plane determined by the impinging and reflected X-ray beams and measuring and recording the intensity of the reflected beam.

4. Apparatus for continuously scanning an X-ray diffraction specimen comprising a source of continuous collimated X-ray beams, a movable specimen holder, said X-ray beam being adapted to continuously impinge upon and be reflected by a specimen adapted to be supported by said holder, means for rotating said specimen holder simultaneously about two axes which intersect at substantially 90°, each of said axes being inclined to said X-ray beams and one of said axes being maintained in a plane normal to the plane containing the impinging and reflected X-ray beams and means for continuously measuring the intensity of the beam of X-rays which is reflected from said specimen carried by said holder.

5. Apparatus for continuously scanning an X-ray diffraction specimen comprising a source of continuous collimated X-ray beams, a movable specimen holder, said X-ray beam being adapted to continuously impinge upon and be reflected by a specimen adapted to be supported by said holder, means for rotating said specimen holder simultaneously about two axes which intersect at substantially 90°, each of said axes being inclined to said X-ray beams and one of said axes being maintained in a plane normal to the plane containing the impinging and reflected X-ray beams, means for oscillating said specimen holder in a plane normal to one of said axes, means for continuously receiving and measuring the intensity of the beam of X-rays reflected from said specimen carried by said holder, and recording means controlled by said receiving means.

6. Apparatus for continuously scanning an X-ray diffraction specimen comprising a source of continuous collimated X-ray beams, a movable specimen holder, said X-ray beam being adapted to continuously impinge upon and be reflected by a specimen adapted to be supported by said holder, means for rotating said specimen holder about a first axis which intersects the beam of X-rays at an acute angle, means for simultaneously rotating said specimen holder about a second axis which intersects said first axis at substantially 90°, each of said axes being inclined to said X-ray beam and one of said axes being maintained in a plane normal to the plane containing the impinging and reflected X-ray beams, means for rectilinearly oscillating said specimen holder in a plane normal to said first axis, a receiver sensitive to the intensity of X-rays adapted to receive X-rays reflected by said specimen, and recording apparatus controlled by said receiver for recording the varying intensities of said reflected X-ray beam.

7. Apparatus for continuously scanning an X-ray diffraction specimen comprising a source of collimated X-ray beams, a movable specimen holder, a specimen having a substantially planar face carried by said holder, means for rotating said specimen about a first axis which is normal to said planar surface and passes through it, means for simultaneously rotating said specimen about a second axis which intersects said first axis at a 90° angle, said point of intersection of said axes and said X-ray beam substantially lying in the same point on the planar surface of said specimen, said beam of X-rays being inclined at an acute angle to each said axis, means for rectilinearly oscillating said specimen in a plane normal to said first axis, the direction of said oscillation being perpendicular to said second axis, a beam of X-rays being reflected from said planar surface, means for maintaining said first axis in a plane normal to the plane determined by the impinging and reflected X-ray beams, a Geiger counter to receive said reflected X-ray beams, a recorder controlled by said Geiger counter and an indexing means operating concurrently with said recorder.

References Cited in the file of this patent

UNITED STATES PATENTS

| | | |
|---|---|---|
| 2,490,673 | Champaygne et al. | Dec. 6, 1949 |
| 2,602,142 | Meloy | July 1, 1952 |